United States Patent [19]

Tominaga

[11] 4,423,938
[45] Jan. 3, 1984

[54] DATA SUPERIMPOSING AND MONITORING DEVICE FOR A CAMERA

[75] Inventor: Shinji Tominaga, Sakai, Japan

[73] Assignee: Minolta Camera Kabushiki Kaisha, Azuchi, Japan

[21] Appl. No.: 299,530

[22] Filed: Sep. 4, 1981

[30] Foreign Application Priority Data

Sep. 19, 1980 [JP] Japan ............................. 55-134304

[51] Int. Cl.³ .................... G03B 17/24; G03B 17.36
[52] U.S. Cl. ............................. 354/106; 354/217; 354/289.1
[58] Field of Search ............... 354/53, 105, 106, 109, 354/217, 289

[56] References Cited

U.S. PATENT DOCUMENTS

| | | | |
|---|---|---|---|
| 3,953,868 | 4/1976 | Kawamura | 354/109 |
| 4,021,828 | 5/1977 | Iura et al. | 354/217 |
| 4,051,489 | 9/1977 | Saito et al. | 354/289 X |
| 4,114,995 | 9/1978 | Stieringer et al. | 354/289 X |
| 4,297,019 | 10/1981 | Yagi et al. | 354/217 X |
| 4,312,581 | 1/1982 | Miyagawa et al. | 354/217 X |

*Primary Examiner*—Donald A. Griffin
*Attorney, Agent, or Firm*—Jackson, Jones & Price

[57] ABSTRACT

A combination data superimposing and monitoring device and frame counter for a camera is provided. A data source for generating information relative to time is displayed on a visual display panel. The same data can be displayed by a predetermimed time adjacent the film strip for recording the same. A frame counter is capable of monitoring a number of photographic shots that are taken and be simultaneously displayed on the display panel in place of the calendar data by year.

9 Claims, 6 Drawing Figures

FIG.3

|     | Indication | Superimposing data |
|-----|------------|--------------------|
| (a) | 17 23  18 (H M  No) | 17 23 |
| (b) | 5 16  18 (M D  No) | 5 16 80 |
| (c) | 5 16  80 (M D  Y) | 5 16 80 |
| (d) | 18 (No) | |

DATA SUPERIMPOSING AND MONITORING DEVICE FOR A CAMERA

BACKGROUND OF THE INVENTION

1. Field of the Invention

The present invention relates to a camera capable of superimposing data on a film, and more particularly to an improvement in a data superimposing and monitoring device for a camera.

2. Description of the Prior Art

There has been known various devices capable of superimposing data on a camera film strip. These devices include a data source for generating electrical signals representative of a date, a data superimposing device responsive to the electrical signals for displaying the date on the film, and a monitoring device responsive to the electrical signals for visually monitoring the date to be superimposed. U.S. Pat. No. 3,953,868 is an example of such a device. The advantage of these devices is to permit a recording of relevant contemporaneous information, such as date with the taking of the object scene picture.

There has also been suggested an electric frame counter for a camera which can count the number of shots which have been made, to provide an electric signal representative thereof to a visual indicator for displaying the frame number. U.S. Pat. No. 4,021,828 discloses such a frame counter.

The subject matter of U.S. Pat. Nos. 3,953,868 and 4,021,828 are incorporated herein by reference to supplement the present disclosure and to provide additional background information.

The photographic camera industry is constantly striving to produce innovative cameras with numerous convenience features while retaining a lightweight compact configuration. Due to the conpetitiveness of this industry, cost is also a factor in incorporating convenience features such as frame counters and data recording devices. Thus, there is still an outstanding need to improve the prior art cameras.

SUMMARY OF THE INVENTION

An object of the present invention is to improve the conventional data superimposing and monitoring devices for cameras.

Another object of the present invention is to expand the utility of the monitoring device.

A further object of the present invention is to provide a simplified compact camera capable of electrically indicating the frame number in addition to the incorporation of a data superimposing and monitoring feature.

The present invention is based on a novel recognition that the portion of the visual indicator or display for monitoring the date of the year is not always necessary, since this data does not change for a relatively long period and is usually understood by the operator without monitoring. It is recognized, however, that while the date by year need not be always viewed, that it is still important to superimpose this date on the film strip for future reference. According to the above concept, the present invention modifies the data monitoring device so that an output from the electric frame counter can be selectively displayed on a portion of the visual indicator in place of the date by year while still incorporating the year date on the film.

Thus, a feature of the present invention is that a portion of the visual indicator can be selectively changed from the data to be actually superimposed on the film. For example, the visual indicator can also monitor month, day and year as they are actually superimposed, if desired.

The above feature provides an advantage in that the indication of a frame number is possible without any additional displaying device.

The elements of the present invention include the following: a data source for generating electrical signals representative of data of month, day and year; a data superimposing device responsive to the electrical signals from the data source including first, second and third variable patterns for displaying the data of month, day and year, respectively, for superimposing them on the camera film; means for counting the number of photographic shots which have been made, and providing an electrical signal representative thereof; a monitoring device including a visual indicator having first, second and third portions corresponding to the first, second and third variable patterns in the data superimposing device, the first and second portions being responsive to the electrical signals from the data source for displaying the data of month and day, respectively, and the third portion being alternatively responsive to an electrical signal from the data source and an electrical signal from the frame counting means for displaying the data of year or frame number; and a control device including means responsive to a manual switch for selecting between the electrical signal from the data source and the electrical signal from the counting means, whereby the third portion of the visual indicator for monitoring the superimposed data of year is selectively utilized to indicate the data of frame number in place of the data of the year.

The features of the present invention, which are believed to be novel, are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 3 represents the relationships between the visual indication and the actually superimposed data of the second embodiment with respect to various cases, (a), (b), (c) and (d).

BRIEF DESCRIPTION OF THE PREFERRED EMBODIMENTS

The following description is provided to enable any person skilled in the camera and electronic arts to make and use the invention and sets forth the best modes contemplated by the inventor for carrying out his invention. Various modifications, however, will remain readily apparent to those skilled in the art, since the generic principles of the present invention have been defined herein specifically to provide an improved compact camera with a combined electronic frame counter and simultaneous film data superimposition capability such as times and dates.

Figure 1:
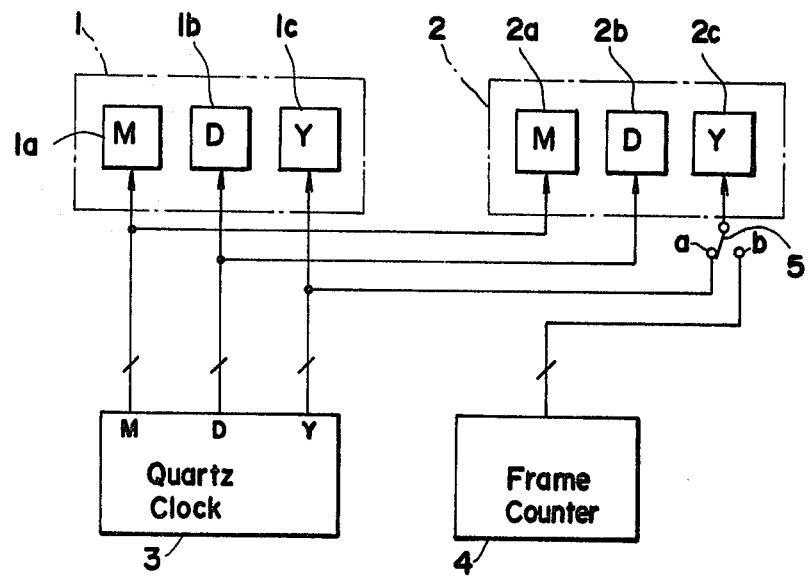
FIG. 1 represents a block diagram of a first embodiment of the present invention.

FIG. 1 shows a first embodiment of the present invention. A pattern of indicia is to be superimposed and recorded onto an image recording member such as film and includes elements 1a, 1b and 1c which may form any desired series of individual indicia units, such as two-digit numerals. An indicator or display 2 is used to monitor the data to be superimposed for the operator and includes elements 2a, 2b and 2c which form any desired two-digit numerals corresponding to the pattern 1. A quartz clock 3 of conventional circuitry is capable of providing the data, including time, month, day and year. Obviously, this data is separate from the object scene viewed through the camera objective lens.

A frame counter 4 is provided to count the number of frames of the film photographed. With a switch 5 positioned on the contact side a, the elements 1a, 1b and 1c and the elements 2a, 2b and 2c are supplied with the same data including the "month", "day", and "year" as those fed from the quartz clock 3 to the pattern 1. The indicator 2 is therefore capable of monitoring the data as they are superimposed by the pattern 1. When the switch 5 is turned to the contact side b, the element 2c which had previously disclosed the "year" is now supplied with data indicative of the film frame number from the frame counter 4 instead of the data, "year".

The switch 5 is normally on the contact side b. Therefore, while the pattern 1 is capable of superimposing the "month", "day" and "year" on the film, the monitoring indicator 2 will actually display the "month", "day" and "frame number". This is because the data with respect to "year" does not vary for a longer period of time than the data "month" and "day" and, accordingly, does not require constant monitoring, and the element 2c for "year" can be assigned to display the frame number which demands a higher frequency of display, thereby providing an effective and full utilization of the indicator 2. If the data "year" is required to be monitored, then the switch 5 is turned to the contact side a so that the indicator 2 provides a visual display of the "month", "day" and "year" as they are actually superimposed by the pattern 1.

Figure 2:
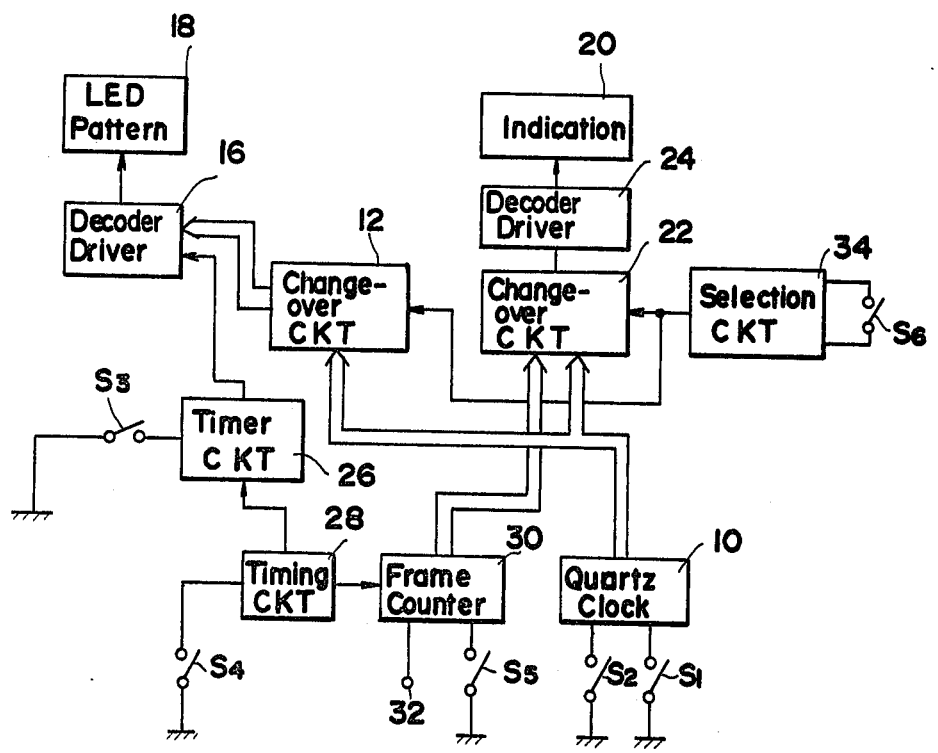
FIG. 2 represents a block diagram of a second embodiment of the present invention.

FIGS. 2 and 3 illustrate another embodiment of the present invention. In FIG. 2, a quartz clock 10 performs the timekeeping function and provides signals indicative of "hours", "minutes", and "year", "month", "day", etc., with its output signals being supplied to a decoder/driver 16 via a changeover circuit 12 for a selection of a superimpose mode. In response to the output signals of the decoder/driver 16, a data-superimposing LED pattern 18 is activated for superimposing the calendar data corresponding to the signals of the quartz clock 10. When the decoder/driver 24 receives the output signals of the quartz clock 10 via a changeover circuit 22 discussed below, a six-digit liquid crystal numeral indicator 20 provides a visual indication of the calendar data in response thereto. A pair of switches $S_1$ and $S_2$ is to set or correct the data supplied from the quartz clock 10. While the liquid crystal indicator 20 provides visual indication of the "month", "day" and "year", as depicted in FIG. 3(c), for example, the switch $S_1$ can be closed once so that the "year" displaying portion thereof flickers to indicate that correction of the year is possible. Whenever the switch $S_2$ is closed under these circumstances, the data indicative of the "year" or the "year" displaying portion of the liquid crystal indicator can be corrected. Such correction is carried out such that the "year" data is incremented by one and returned from "99" to "00". This may also be effected on a decremental basis or by the provision of two switches, one for an increment and the other for decrement in place of the single switch $S_2$.

A timer circuit 26 is adapted to control the amount of exposure of light for superimposing the data by governing the enabled time of the data-superimposing LED pattern 18 to insure correct exposure on a film. The timer circuit 26 is capable of selectively counting one of predetermined two time periods, the selection depending on whether switch $S_3$ is opened or closed, i.e., the timer circuit 26 counts a first time period for film speed ASA 100 with switch $S_3$ opened, and a second time period for film speed ASA 100 with switch $S_3$ closed. The switch $S_3$ may be selected by hand, or by an element attached on a film casing or casette at a location representative of the film speed of the film contained therein. As an alternative measure to the switch $S_3$, a plurality of switches or a combination of a variable resistor and an analog-to-digital converter may be employed for accommodation to a wide range of different film speeds. Furthermore, the liquid crystal indicator 20 could also be adapted to display a film speed setting and this setting may be incremented or decremented by a suitable manipulation (not shown).

A timing control circuit 28 feeds a pulse signal to the timer circuit 26 upon closure of a switch $S_4$ which is responsive to an operation of the camera, such as the beginning or the completion of the opening movement of a shutter. Upon receipt of this pulse signal, the timer circuit 26 feeds to the decoder/driver 16 a signal which lasts for a predetermined period of time, depending on the opening or closing of the switch $S_3$, thus firing the data-superimposing LED 18 for that set period of time. In response to the closing movement of the switch $S_4$, the timing control circuit 28 also feeds a pulse signal to a frame counter 30 and increments the count of the frame counter 30. The above construction that two operations are caused by the single switch $S_4$ further improves the durability and reliability of the correlative functions.

The reset switch $S_5$ is in an open position when the back lid of the camera is opened and is placed into a closed position to reset the frame counter when the back lid is closed. The frame counter 30 provides an output indicative of "−1" when the reset switch $S_5$ is closed in association with the movement of the back lid. In this condition, if one frame of the film is wound up and the shutter is released to make a blind shot, the counter 30 receives a pulse from the timing control circuit 28 to increment its count from "−1" to "0". Should the film be wound again and another blind shot be made, the counter feeds an output indicative of its count "1". A terminal 32 is connected to feed a "high" output signal to a wind control circuit (not shown) for controlling a motor-powered winder until the count of the frame counter 30 shows "1" after closure of the back lid. While receiving this "high" signal, the wind control circuit drives the motor-powered winder to wind the film up to its start position. Thus, the motor-powered winder stops its operation when the frame counter shows "1" and the level at terminal 32 is changed into "low" signal.

The output of the frame counter 30 is supplied to a changeover circuit 22. A selection circuit 34 is adapted to both select the visual display on the liquid crystal indicator 20 and the activation of data to be superimposed by the data-superimposing LED pattern 18 via the changeover circuit 22 and the changeover circuit 12, respectively. First, as indicated at (a) in FIG. 3, the liquid crystal indictor 30 displays a frame number in response to the output of the frame counter 30 at its rightmost two-digit positions and displays the time data (i.e., "hour" and "minute") at its remaining four-digit positions, while the LED pattern 18 is fired to superimpose only the time data now on the liquid crystal indicator. In this condition, if a switch $S_6$ is actuated once, then the liquid crystal indicator displays the frame count at its right two-digit positions and the data "month" and "day" at its remaining four-digit positions, while the LED pattern is fired to superimpose the data "month", "day" and "yer", as shown at (b) in FIG. 3. If the switch $S_6$ is depressed again, then the liquid crystal indicator displays the data "year" at its rightmost two-digit positions, and the data "month" and "day" at its remaining four-digit positions and the LED pattern emits light for superimposing the data "month", "day" and "year" as shown at (c) in FIG. 3. Should the switch $S_6$ be further actuated, the liquid crystal indicator 20 will only display the frame count and the LED pattern 20 will neither emit light nor superimpose the data, as shown at (d) in FIG. 3. Upon a further actuation of the switch $S_6$, display indication and superimposing are returned to the state of (a) in FIG. 3. The above events take place in a recurring manner in response to the manual operation of switch $S_6$. It is noted that the frame counter 30 can be adapted to flicker the frame number, such as shown at (a), (b) and (d) in FIG. 3 after the back lid is closed, when the frame count shows "−1" or "0" and requires making a blind shot.

While the foregoing description has set forth the specific embodiments of the present invention, the present invention should not be limited thereto. For example, the data-superimposing pattern 18 may be set up by a liquid crystal pattern instead of the above-mentioned LED pattern, and such a liquid crystal pattern is illuminated with a lamp for superimposing data on the film strip. Alternatively, the liquid crystal indicator may be substituted with an LED indicator. Indication and superimposing also may be effected over any desired length of digits other than six digits.

It is to be further understood that various modifications of the generic concepts of this invention are possible without departing from its spirit, and, accordingly, the scope of the present invention should be determined solely from the following claims.

What is claimed is:

1. A combination data superimposing and monitoring device and frame counter for a camera comprising:

a data source for generating electrical signals representative of data of a month, day and year;

a data superimposing device responsive to the electrical signals from said data source including first, second and third variable patterns for superimposing the data of month, day and year, respectively, on the camera film;

means for determining a frame count of the camera film to provide an electrical signal corresponding thereto;

a monitoring device including a visual indicator having first, second and third display portions corresponding to the first, second and third variable patterns in said superimposing device, said first and second portions being responsive to the electrical signals from said data source for displaying the data of month and day, respectively, and the third portion being alternatively responsive to the electrical signal from said data source and the electrical signal from said determining means for displaying the data of year or frame number; and a control device including means responsive to manual operation for selecting between, a first mode in which both the third portion of said monitoring device and said data superimposing device are responsive to the electrical signal from said data source, and a second mode in which the third portion of said monitoring device is responsive to the electrical signal from said determining means while said data superimposing device is responsive to the electrical signal from said data source, whereby the third portion of said visual indicator for monitoring the superimposed data is selectively utilized to indicate the data of frame number in place of the data of year.

2. The invention of claim 1, wherein said control device further includes means responsive to a manual operation for disabling said superimposing device and for driving only the third portion of said visual indicator with the electrical signal from said determining means to enable a photographic shot without the data being superimposed while utilizing the monitoring device for displaying a frame number indication.

3. The invention of claim 1, wherein said data source is further capable of generating electrical signals representative of data of hour and minute in place of the data of month, day and year, and wherein said control device further includes means responsive to a manual operation for driving the first and second portions of said visual indicator with the electrical signals representative of the data of hour and minute and the third portion of said visual indicator with the electric signal from said determining means, said superimposing device being driven only with the data of hour and minute.

4. The invention of claim 1, wherein said data source includes a quartz clock, the data being generated on the base of the quartz clock.

5. The invention of claim 1 further comprising means responsive to a camera operation relating to the taking of one photographic shot for actuating said data superimposing device and for changing the count number of said determining means by one count.

6. A data superimposing and monitoring device for a camera comprising:

a data source for generating electrical signals representative of data to be superimposed on an image recording member;

a data superimposing device responsive to the electrical signals from said data source;

means responsive to the electrical signals from said data source for monitoring the data to be superimposed, said monitoring means including a visual indicator; and means responsive to a manual operation for optionally changing a part of indication of the visual indicator from the actual data which is superimposed on the image recording member.

7. In a camera employing a film strip for taking individual shots of object scenes through an objective lens, the improvement comprising:

means for superimposing predetermined data on the film strip relative to the object scene independent of the objective lens, the data being a composite of a plurality of individual units; E means for determining a frame count of the film strip;

means for activating the display means to display the film count on at least a portion of the individual units, and switch means to simultaneously permit the predetermined data to be superimposed on the film while displaying only a portion of that data to the operator plus displaying the frame count.

8. The invention of claim 7 wherein the means for superimposing includes a source of light to illuminate the data on the film strip, and further includes means for adjusting the time of illumination depending on the speed of the film.

9. The invention of claim 7 further including a clock circuit to generate data on time and calendar dates, wherein the switch means displays the frame count on the individual display units dedicated to the last two digits of a calendar year.

* * * * *

UNITED STATES PATENT AND TRADEMARK OFFICE
CERTIFICATE OF CORRECTION

PATENT NO. : 4,423,938
DATED : January 3, 1984
INVENTOR(S) : Shinji Tominaga

It is certified that error appears in the above—identified patent and that said Letters Patent is hereby corrected as shown below:

Column 5, line 12, delete "yer" and substitute --year--.

Column 6, line 67, delete "E".

Column 6, at line 68, insert indented means clause --display means for displaying the date to an operator including a display member capable of displaying the plurality of individual units;--.

Signed and Sealed this

Fifth Day of March 1985

[SEAL]

Attest:

DONALD J. QUIGG

*Attesting Officer*     *Acting Commissioner of Patents and Trademarks*